Nov. 24, 1925.
R. R. SEARLES
1,562,594
VEHICLE SPRING BEARING
Filed March 10, 1925
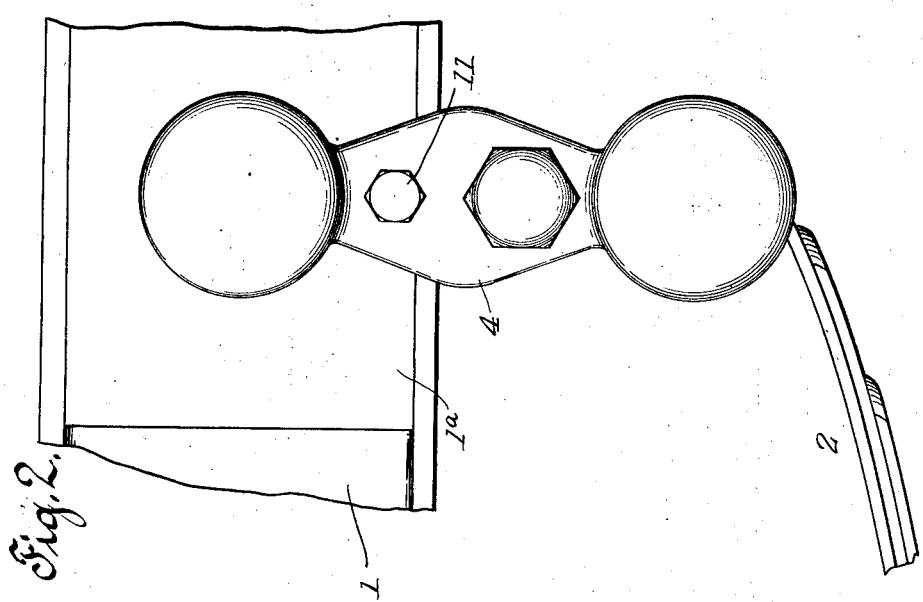
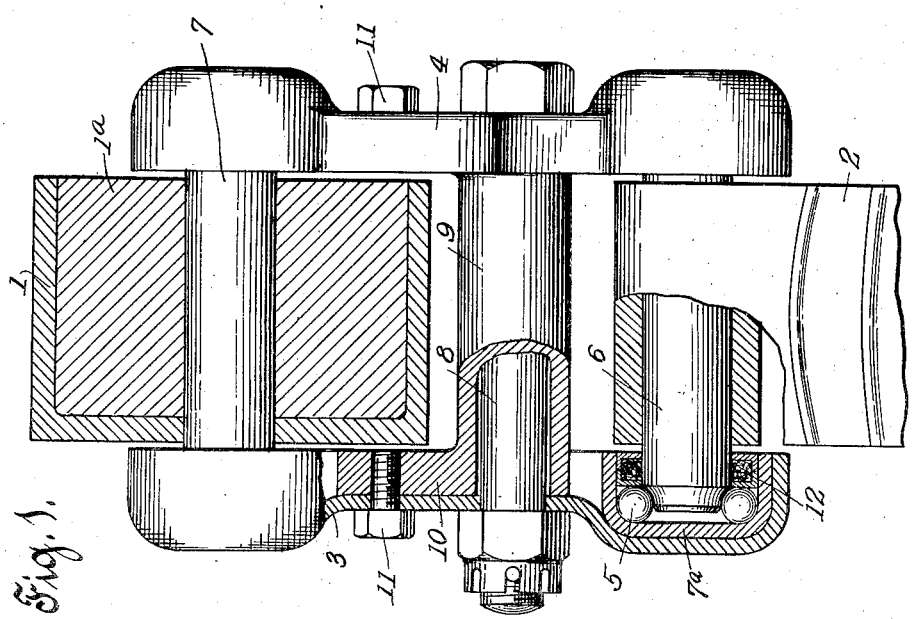
INVENTOR
R. R. Searles
BY
Mitchell Bechert
ATTORNEYS Patented Nov. 24, 1925.

1,562,594

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

VEHICLE-SPRING BEARING.

Application filed March 10, 1925. Serial No. 14,392.

*To all whom it may concern:*

Be it known that I, RAYMOND R. SEARLES, a citizen of the United States of America, residing at New Britain, Connecticut, have invented a new and useful Vehicle-Spring Bearing, of which the following is a specification.

This invention relates to improvements in anti-friction bearing connections for vehicle springs particularly adapted for heavy vehicles such as trucks.

It is an object of the invention to provide a bearing which will afford greater facility in attaching the spring to the vehicle body than is ordinarily possible where depending brackets are attached to the vehicle sill for the purpose of the spring connection.

It is a further object to provide novel means for strengthening and supporting the shackle links of an anti-friction spring bearing.

In the accompanying drawings which show one form of the invention:

Figure 1 is an end elevation, partly in section, showing such parts as are essential to a full understanding of the invention;

Figure 2 is a side elevation of the parts shown in Figure 1.

1 represents in cross-section a channel beam, which constitutes one so-called side sill of a vehicle frame. 2 represents one end of a vehicle spring, which it is necessary to properly secure to said sill. Ordinarily, it is customary to provide a depending bracket, riveted or otherwise fastened to the lower side of the sill, but this tends to raise the vehicle body, placing the center of gravity, in some instances, undesirably high. My present invention comprehends a construction which will permit a minimum of clearance between the spring and the sill, so that the vehicle body may be lowered.

The connecting elements proper comprise two complementary shackle links 3—4, preferably formed from struck-up metal, so that the middle portion of each link is in the form of a channel, both ends of each link being provided with bearing surfaces, to receive or coact with anti-friction devices, such as balls 5—5. In the particular form shown, 6 is a pin, which is mounted in the end of the spring 2. The ends of said pin project beyond the side edges of the spring sufficiently far to engage with and be supported by the balls 5—5. A similar pin 7 is mounted in the sill 1. A suitable fillet piece 1ª is mounted in the channel of the sill, so as to properly support the pin 7 against tilting. The ends of the pin 7 may be supported by anti-friction devices at the upper ends of the links in a manner similar to that already described in connection with the lower ends thereof. The bearing surfaces for the balls at the link ends may be formed in any suitable way, for example, by separate bearing cup 7ª of suitably tempered steel, which cups may be inserted in the link ends to carry the devices 5.

8 represents a bolt which passes through suitable apertures or passages in the links 3—4, for the purpose of holding them in operative position. In order to attain the greatest compactness, so that excessive clearance may be avoided, it is desirable, in many cases, to have this bolt pass through the channels 3—4 closer to the lower than to the upper ends thereof, as indicated in the drawings. As this would tend to cause a greater strain to be applied on the lower ends of the links than on the upper ends, I provide an appropriate combined reinforcing and spacing element, which comprises a tubular portion 9, through which the bolt passes, the tubular portion having at each end a head-like extension 10, which extends longitudinally of the channeled portion of each link, so as to not only reinforce the same, but so as to support the same in parallelism, and preferably at the proper spaced distance. 11—11 are supplemental screws, which may be employed, if desired, to further clamp the head portions 10 to the respective links 3—4. By this construction it will be seen that the shackle links are held in proper spaced and parallel relation, and in such a manner that the spring end 2 may be brought very close to the sill 1, thus permitting the vehicle body to be positioned much lower than would otherwise be possible.

12 represents conventionally a washer, which tends to exclude dust and dirt from the interior of the anti-friction bearing. The particular construction of this feature may be varied. It is likewise plain that the particular form of the anti-friction bearing which is provided at each end of each link may be modified in a variety of ways.

What I claim is:

1. In a means for connecting vehicle springs to vehicle bodies, a pair of complementary shackle links, each of said links having its intermediate portion channeled, a combined spacer and link-reinforcing means comprising a portion extending across from link to link with a laterally projecting head portion on each end thereof arranged to fit within the channeled portion of the links, respectively, with means for securing said links to said connecting portion.

2. In a means for connecting vehicle springs to vehicle bodies, a pair of complementary shackle links, each of said links having its intermediate portion channeled, a combined spacer and link-reinforcing means comprising a portion extending across from link to link with a laterally projecting head portion on each end thereof arranged to fit within the channeled portion of the links, respectively, with means for securing said links to said connecting portion, and a bolt extending through said links and through said connecting portion for securing said links together.

3. In a means for connecting vehicle springs to vehicle bodies, a pair of complementary shackle links, a spacer member between said links and having extensions thereon for reinforcing said links, and means for securing said links together.

RAYMOND R. SEARLES.